United States Patent
Seibt et al.

(10) Patent No.: US 9,365,368 B2
(45) Date of Patent: Jun. 14, 2016

(54) NOISE REDUCTION UNIT FOR VACUUM SUCTION DRAINS

(71) Applicant: Airbus Operations GmbH, Hamburg (DE)

(72) Inventors: Christian Seibt, Buchholz (DE); Matthias Mueller, Harsefeld (DE)

(73) Assignee: Airbus Operations GmbH (DE)

( * ) Notice: Subject to any disclaimer, the term of this patent is extended or adjusted under 35 U.S.C. 154(b) by 238 days.

(21) Appl. No.: 13/866,136

(22) Filed: Apr. 19, 2013

(65) Prior Publication Data

US 2013/0287505 A1    Oct. 31, 2013

Related U.S. Application Data

(60) Provisional application No. 61/638,608, filed on Apr. 26, 2012.

(30) Foreign Application Priority Data

Apr. 26, 2012  (EP) .................................... 12165713

(51) Int. Cl.
| | |
|---|---|
| *B65G 51/00* | (2006.01) |
| *B65G 53/54* | (2006.01) |
| *B64D 11/02* | (2006.01) |
| *E03F 1/00* | (2006.01) |

(52) U.S. Cl.
CPC ............... *B65G 53/54* (2013.01); *B64D 11/02* (2013.01); *E03F 1/006* (2013.01)

(58) Field of Classification Search
USPC .......... 406/195, 198; 4/423, 661; 138/45, 178
See application file for complete search history.

(56) References Cited

U.S. PATENT DOCUMENTS

| | | | | |
|---|---|---|---|---|
| 3,742,582 A * | 7/1973 | Broske | ........................... | 228/107 |
| 3,807,635 A * | 4/1974 | Platt | ............................... | 239/726 |
| 4,071,195 A * | 1/1978 | Kuhns et al. | ................... | 239/289 |
| 4,094,467 A * | 6/1978 | Meyer | ........................... | 239/230 |
| 4,479,460 A * | 10/1984 | Webber | ....................... | 123/41.27 |
| 4,637,640 A * | 1/1987 | Fournier et al. | ................ | 285/319 |
| 5,316,261 A * | 5/1994 | Stoner | ........................ | G01F 1/40 |
| | | | | 138/45 |
| 5,326,468 A * | 7/1994 | Cox | ........................ | B01F 5/0646 |
| | | | | 138/45 |
| 5,351,752 A * | 10/1994 | Wood et al. | ..................... | 166/68 |
| 5,393,417 A * | 2/1995 | Cox | ........................ | B01F 5/0646 |
| | | | | 138/45 |
| 5,839,473 A * | 11/1998 | Caine | ...................... | F01N 13/08 |
| | | | | 137/527.6 |
| 5,931,184 A * | 8/1999 | Armenia et al. | ............... | 137/312 |
| 7,363,940 B2 * | 4/2008 | Oberley | ................ | F25B 41/067 |
| | | | | 137/493.8 |
| 7,407,404 B2 * | 8/2008 | Reid | .............................. | 439/367 |
| 8,100,182 B2 * | 1/2012 | Smith et al. | .................... | 166/346 |
| 8,701,715 B1 * | 4/2014 | Crompton | ............... | F16K 17/34 |
| | | | | 137/460 |
| 8,753,505 B2 * | 6/2014 | Sprague | ................ | B01F 3/0446 |
| | | | | 138/45 |

(Continued)

FOREIGN PATENT DOCUMENTS

| | | |
|---|---|---|
| DE | 102005013566 A1 | 10/2006 |
| EP | 1544363 A1 | 6/2005 |
| EP | 1832689 A1 | 9/2007 |

*Primary Examiner* — Joseph Dillon, Jr.
(74) *Attorney, Agent, or Firm* — Lerner, David, Littenberg, Krumholz & Mentlik, LLP (57) ABSTRACT

A noise reduction unit for inserting in a vacuum suction drain is adapted to be flown through by a material to be conveyed through the vacuum suction drain and comprises an inlet section with a first diameter, a middle section with a second diameter and an outlet section with a third diameter. The middle section is adapted to affect a flow velocity reduction of the material to be conveyed such that the noise level arising during the conveying process is being reduced.

11 Claims, 7 Drawing Sheets

(56) References Cited

U.S. PATENT DOCUMENTS

| | | | |
|---|---|---|---|
| 2003/0082017 A1* | 5/2003 | Just et al. | 406/191 |
| 2003/0230148 A1* | 12/2003 | Saxton | 73/732 |
| 2004/0111097 A1* | 6/2004 | Van Heerden | 606/119 |
| 2012/0014757 A1 | 1/2012 | Muller et al. | |
| 2012/0111555 A1* | 5/2012 | Leveau et al. | 166/65.1 |
| 2013/0228164 A1* | 9/2013 | Davis et al. | 126/635 |
| 2014/0137628 A1* | 5/2014 | Rudroff | 73/1.18 |
| 2014/0373840 A1* | 12/2014 | Graham et al. | 128/203.27 |

* cited by examiner

NOISE REDUCTION UNIT FOR VACUUM SUCTION DRAINS

CROSS-REFERENCE TO RELATED APPLICATIONS

This application claims the benefit of the filing date of European patent application no. 12 165 713.4 filed Apr. 26, 2012, and of U.S. Provisional Patent Application No. 61/638,608 filed Apr. 26, 2012, the disclosures of which are hereby incorporated herein by reference in their entirety.

FIELD OF THE INVENTION

The present invention relates to a noise reduction unit for inserting in a vacuum suction drain, a vacuum system and an aircraft with a vacuum system.

BACKGROUND OF THE INVENTION

The term "vacuum system" and "vacuum suction drain" refers to special pneumatic conveyors. Generally speaking, in such conveyors transportation takes place in that a pressure difference is applied to the material to be conveyed, i.e. the material to be conveyed is entrained in the fluid flow generated as a result of the pressure difference, wherein generally speaking air is used as the transport medium.

Especially in aircraft, vacuum systems are used for the transportation of waste from the cabin, for example from toilets or galleys, to a central waste collecting tank. In this arrangement the material to be conveyed is conveyed to the waste collecting tank by way of a pipeline network, i.e. vacuum suction drains. Negative pressure in the waste collecting tank in relation to the cabin pressure provides the required pressure difference.

In aircraft with pressurized cabins the pressure difference between the cabin and the environment is used directly to generate the negative pressure for pneumatic conveyance. When this pressure difference is insufficient, e.g. on the tarmac or at low altitudes, the required pressure difference is generated by a compressor.

In the case of toilets with a pneumatic conveyor system in aircraft systems, often a loud noise level arises. This noise is even noticed by the passengers in the cabin and is perceived by passengers to be uncomfortable.

DE 10 2005 013 566 A1 and US 2012/0014757 A1 describe an arrangement for adapting the transportation behavior of material to be conveyed through drains of a vacuum system wherein a valve is arranged in a vacuum suction drain.

BRIEF SUMMARY OF THE INVENTION

An aspect of the present invention may provide an alternative noise reduction unit for vacuum suction drains with improved noise damping characteristics.

According to an aspect of the invention, a noise reduction unit for inserting in a vacuum suction drain is adapted to be flown through by a material to be conveyed through the vacuum suction drain, wherein the noise reduction unit comprises an inlet section with a first diameter, a middle section with a second diameter and an outlet section with a third diameter, wherein the middle section is arranged between the inlet section and the outlet section, wherein the middle section is adapted to affect a flow velocity reduction of the material to be conveyed from the inlet section to the outlet section and wherein the second diameter differs from both the first diameter and the third diameter.

The vacuum suction drain may be a pipe of a vacuum suction system, which vacuum suction system may be adapted for conveying material from a suction point to a collection point, for example from a first container like a wash basin or toilet bowl, i.e. the suction point, to a second container like a waste collection container, i.e. the second container.

The material to be conveyed may in particular be a multiphase material, i.e. consisting of liquid phase material and solid phase material.

The noise reduction unit may be adapted for modular insertion in the vacuum suction drain such that the material to be conveyed flows through the vacuum suction drain and as part of this flowing or suction process flows through the noise reduction system. The noise reduction unit may be inserted additional in an existing system of vacuum suction drains as well as in a mounting process prior to an initial operation of the vacuum suction drain.

The inlet section and the outlet section of the vacuum suction unit connect the noise reduction unit to the vacuum suction drain, wherein the material to be conveyed flows through the noise reduction unit in a direction from the inlet section via the middle section to the outlet section.

The middle section is adapted to affect a flow velocity reduction of the material to be conveyed. The middle section may also reduce the flow velocity of the air which serves as the transportation medium for the material to be conveyed.

In general, the suction of the material to be conveyed in vacuum systems occurs because of a pressure difference between the suction point and the waste collection container. During the conveying process, i.e. the movement and motion of the material to be conveyed through the vacuum suction drain, this pressure difference decreases gradually as air is soaked into the waste collection container. Thus, the initial pressure difference has to be high enough such that the material to be conveyed passes the whole length of the vacuum suction drain. In particular the high pressure difference when starting the conveying process causes an unpleasant and inconvenient noise comparable to a burst noise or a bang. Reducing the initial pressure difference is not an alternative, as then there is a danger that the material to be conveyed does not pass the whole length of the vacuum suction drain. Instead, the noise reduction unit as described above and hereinafter reduces the velocity of the material to be conveyed directly when starting the suction process. Thus, the suction pressure will be sustained for a longer time, as the passed air volume and material to be conveyed volume per unit of time will be decreased.

In other words, the initial conveying velocity will be reduced (which also reduces the generated noise during the suction process), such that the pressure difference will be sustained for a longer time instead of having a high initial conveying velocity which results in a high initial noise as usual by now.

The noise reduction unit as described above and hereinafter may be used in particular in vacuum suction systems like vacuum toilets.

According to a further embodiment of the invention, the second diameter differs from the first diameter such that the flow of the material to be conveyed through the vacuum suction drain causes turbulences in the noise reduction unit and/or in the vacuum suction drain, wherein the turbulences reduce the effective flow cross-section of the vacuum suction drain such that the flow velocity of the material to be conveyed is reduced.

In particular, the second diameter may be greater than the first diameter such that the turbulences occur at the transition section from the first diameter of the inlet section to the second diameter of the middle section. These turbulences will increasingly arise with increased velocity of the conveyed material through the vacuum suction drain and the noise reduction unit. Thus, the velocity of the material to be conveyed and of the air used for conveying the material will be reduced in the initial phase of the suction process and the noise which arises in conjunction with the conveying velocity will be reduced.

According to a further embodiment of the invention, the second diameter is greater than the first diameter and the enlargement of the second diameter with respect to the first diameter is adapted to cause the turbulences in the flow of the material to be conveyed.

The transition from the inlet section with the first diameter to the middle section with the second diameter may be graded, stepped or rounded as described below in more detail. The transition may be designed depending on the material to be conveyed and in particular the proportion of transporting air, liquid or fluid phase material and solid material.

As the second diameter of the middle section is greater than the first diameter of the first section, which first diameter corresponds to the diameter of the vacuum suction drain connected to the inlet section, there is no danger that material passing the vacuum suction drain may cause blockage or clogging in the noise reduction unit.

According to a further embodiment of the invention, the second diameter is less than the first diameter and the reduction of the second diameter with respect to the first diameter is adapted to reduce the flow velocity of the material to be conveyed.

As the second diameter of the middle section is less than the first diameter, the cross-section of the noise reduction unit is reduced such that in particular a flow velocity of the transportation air in the initial phase of the conveying process is reduced which may also reduce the noise when starting the suction process and the noise of the suction process itself.

According to a further embodiment of the invention, the middle section comprises a flexible hose, wherein the flexible hose is arranged between the inlet section and the outlet section, wherein the flexible hose comprises a constriction, which corresponds to the second diameter.

The flexible hose is flown through by the material to be conveyed during the suction process. The flexible hose comprises a wall which is adapted to stretch or expand in a direction orthogonal to the flow direction, i.e. in a radial direction of the hose. In other words, two opposite points of the wall of the flexible hose are moving towards each other and away from each other when the flexible hose expands or contracts, respectively.

In an unloaded state of the vacuum suction drain and the noise reduction unit, i.e. when no material or just transportation air flows through the noise reduction unit, the flexible hose is in the contracted state such that the cross-section of the middle section, that is the flexible hose, is reduced and the flow velocity of the transportation air is reduced. When the material to be conveyed passes the flexible hose it will expand or stretch such that solid phase material may pass the flexible hose without blocking or clogging it.

Once again, this structure or design of the noise reduction unit will reduce the velocity of the transport air used for transporting the material to be conveyed without reducing the initial pressure difference between the suction point and the collecting container such that the pressure difference ensures that the material to be conveyed will pass the whole length of the vacuum suction drain and yet the initial suction noise will be reduced.

In order to avoid adhesion of parts of the material to be conveyed the flexible hose and/or the middle section as described above and hereinafter may comprise an anti-adhesive layer on a part of an inner surface or the entire inner surface, that is the surface of the inlet section, middle section and/or the outlet section towards a central axis of the noise reduction unit. The anti-adhesive layer may comprise Teflon or a material comprising Sol-gel, for example.

According to a further embodiment of the invention, the flexible hose comprises a material tension, which material tension results in a constriction of the flexible hose, i.e. the constriction of the flexible hose is a result of a material tension of the flexible hose.

Hence, the flexible hose may comprise an elastically reversible material which is adapted to keep the flexible hose in the contracted state in its original position. In case that solid phase material passes the flexible hose, it will expand from its original position such that the second diameter enlarges and the solid phase material is able to pass the flexible hose.

According to a further embodiment of the invention, the noise reduction unit as described above and hereinafter comprises a pressurization element, which is adapted to cause the constriction of the flexible hose.

The pressurization element may be arranged to support or replace the material tension of the flexible hose of the middle section. The pressurization element may be a circumferential element arranged at the middle section of the noise reduction unit and adapted to press the wall of the flexible hose towards the central axis of the noise reduction unit.

According to a further embodiment of the invention, the pressurization element comprises a gas volume which is adapted to press the wall of the flexible hose towards the central axis of the noise reduction unit.

Thus, the pressurization element is adapted to apply a pressure by means of the gas to the flexible hose, such that the flexible hose is pressed towards the central axis of the noise reduction unit in order to reduce the cross-section of the middle section. Further on, the pressurization element may comprise an elastic cushion, a liquid or a foam which is adapted to keep the flexible hose in an unloaded state of the vacuum suction drain in its original shape, i.e. to keep the flexible hose constricted, but allows an enlargement of the flexible hose when being passed by solid phase material.

According to a further embodiment of the invention, the gas pressure of the gas volume is controllable, wherein the controlled gas pressure is adapted to vary the second diameter, i.e. the extent of the flexible hose, wherein an increased gas pressure causes a greater constriction of the flexible hose such that the second diameter is reduced.

The gas pressure may be controlled in order to increase or decrease such that the gas volume increases or decreases, respectively. Corresponding to the varied gas pressure and the according gas volume the flexible hose will become stretched or released, wherein the second diameter gets smaller or larger when the gas volume increases and decreases, respectively.

A reduced second diameter reduces the cross-section of the flexible hose such that a flow velocity of the transportation air and the material to be conveyed is reduced. As to not result in blockage or clogging, the flexible hose and the gas volume allow an expansion of the second diameter, in particular when being passed by solid phase material.

The gas pressure may be controlled by a control loop or control system, wherein the noise originated in conveying material through the vacuum suction drain may be the control variable. The noise may be detected by a microphone or any other sensor suitable for detecting noise or a noise level. In general, the control loop may increase the gas pressure (that is: reduce the second diameter, which results in a reduction of the flow velocity of the material to be conveyed) when the noise level exceeds a given threshold value.

Of course there may be used other control variables than the produced noise like the weight of the material to be conveyed or the composition of the multiphase material. The gas pressure may be increased in case there are no solid phase elements in the material to be conveyed such that the cross-section of the flexible hose or the middle section in general may be smaller and the flow velocity is reduced.

The gas pressure may vary during the transportation of the material to be conveyed or may be constant for the time period of a single transportation process, i.e. the gas pressure may be determined prior to each single transportation process, wherein the detected control variable during the previous transportation process determines the gas pressure of the following transportation process.

According to a further embodiment of the invention, the pressurization element comprises an elastically reversible element which is adapted to press the wall of the flexible hose towards the central axis of the noise reduction unit.

The elastically reversible element may be a foam like foamed plastic or foamed material in general. The foam may be adapted to bring the flexible hose in its constricted position such that the second diameter is being reduced. As the foam is elastically reversible, the second diameter is able to vary in case solid phase material passes the middle section and a blockage or clogging is avoided.

The elastically reversible element may be used as an alternative or additional to the pressurized gas volume. In the latter case, the gas volume may intrude the hollow spaces or cavities of the foam.

According to a further embodiment of the invention, the noise reduction unit as described above and hereinafter comprises an elastic membrane which extends in a plane orthogonal to the flow direction and comprises an opening for being flown through by the material to be conveyed, wherein the elastic membrane is adapted to extend when being flown through by the material to be conveyed, wherein the opening of the membrane is adapted to reduce the effective cross-section of the noise reduction unit such that a flow velocity of the material to be conveyed is reduced.

In an unloaded state of the noise reduction unit the membrane extends towards the central axis of the noise reduction unit. The opening of the membrane represents the minimum cross-section of the noise reduction unit. Thus, when starting the suction process and during the suction process, the amount of transportation air flowing through the noise reduction unit is being reduced such that the suction noise and in particular the initial noise when starting the suction process is being reduced. After starting the suction process the transportation air and the conveyed material will result in extending the opening of the membrane.

As the diameter of the opening will not directly adapt to the diameter of the noise reduction unit there will occur a transition from a narrow cross-section to a wider cross-section such that turbulences will occur at this point. The effect of these turbulences may further reduce the flow velocity of the transportation air and of the material to be conveyed as described above in more detail.

The membrane may be arranged in the inlet section, in the middle section or in the outlet section and may be combined with any of the means for reducing the flow velocity of the material to be conveyed described above and hereinafter.

According to another aspect of the invention, a vacuum suction system is provided which comprises a first vacuum suction point, a second vacuum suction point, a waste collecting container, a first drain for connecting the first vacuum suction point to the waste collecting container, a second drain for connecting the second vacuum suction point to the waste collecting container and a first noise reduction unit, wherein the first vacuum suction point is arranged at a first distance to the waste collecting container and the second vacuum suction point is arranged at a second distance to the waste collecting container and wherein the first noise reduction unit is arranged in the first drain to adapt a first flow velocity in the first drain to a second flow velocity in the second drain.

In general the flow velocity of material to be conveyed in a vacuum suction drain depends on the pressure difference between a suction point and a collection point. In vacuum suction systems with a multitude of suction points and a corresponding number of drains the pressure difference further depends on the length of the drains as the air capacity or the air volume of the drains have an influence to the pressure difference between the collection point and every single suction point. The pressure difference has to be adapted in order to ensure that the material to be conveyed passed the longest drain. This may lead to the effect that the pressure difference is too high for shorter drains which results in a higher noise level in the vicinity of suction points arranged close to the collection point.

The vacuum suction system as described above and hereinafter may avoid the different noise level generated by suction points connected to the waste collecting container by means of drains with different lengths as a noise reduction unit in a first drain is adapted to adapt the flow velocity of the material to be conveyed through the first drain. In particular, the noise reduction unit may be arranged in the shorter one of the first drain and the second drain, such that the flow velocity of the material to be conveyed through the shorter drain is reduced.

Thus, a demand oriented providing of pressure difference and flow velocity for a vacuum suction process depending on the distance of the suction point to the waste collecting container is provided. The vacuum suction system as described above and hereinafter may in particular reduce the noise level produced by vacuum suction points close to the waste collecting container.

The vacuum suction system is adapted to reduce the flow velocity in short drains, wherein the pressure difference provided by the system is specified to ensure a transportation process or vacuum suction process with respect to the drains having the maximum length.

According to a further embodiment of the invention, the vacuum suction system comprises a second noise reduction unit which is arranged in the second drain to adapt a second flow velocity in the second drain.

Thus, the flow velocity in the first drain and the flow velocity in the second drain may be adapted independent from each other and independent from the initial pressure difference between each of the suction points and the waste collecting container.

According to a further embodiment of the invention, are the first noise reduction unit and the second noise reduction unit a noise reduction unit as described above and hereinafter.

Hence, the vacuum suction system may comprise any noise reduction unit for reducing the flow velocity of the transportation air and the material to be conveyed in one drain or a multitude of drains or a noise reduction unit as described in more detail above and hereinafter.

According to another aspect of the invention, an aircraft with a vacuum suction system as described above and hereinafter is provided, wherein the first vacuum suction point and the second vacuum suction point are one element of the group consisting of a vacuum toilet system, a waste water basin and a vacuum ventilation system.

The vacuum suction system may of course be used in other means of transport as land vehicles and water vehicles, for example in buses, trains and ships.

These and other aspects of the present invention will become apparent from and elucidated with reference to the embodiments described hereinafter.

BRIEF DESCRIPTION OF THE DRAWINGS

Exemplary embodiments of the invention will be described in the following with reference to the following drawings.

DETAILED DESCRIPTION

It should be noted that the same reference signs may be used for similar or identical elements.

The illustrations in the figures are diagrammatic and not to scale.

Figure 1:
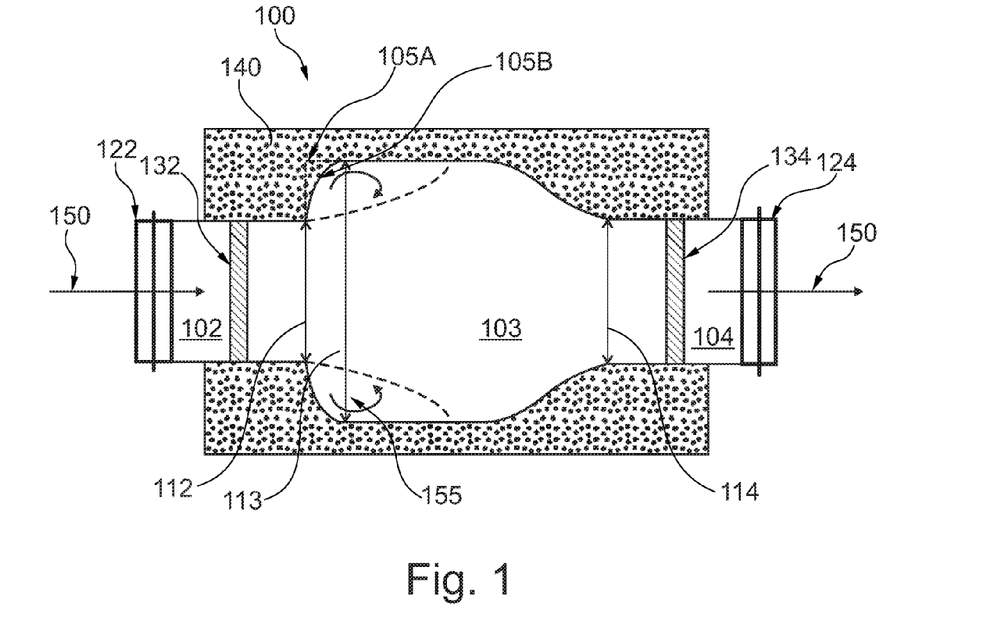
FIG. 1 illustrates a noise reduction unit according to an exemplary embodiment of the invention.

FIG. 1 illustrates a noise reduction unit 100 with an inlet section 102, a middle section 103 and an outlet section 104. The inlet section comprises a first connector 122 and the outlet section comprises a second connector 124, each for connecting the noise reduction unit into a vacuum suction drain (not shown). A noise insulation element 140 surrounds or encloses the noise reduction unit circumferential. The inlet section comprises a first damper 132 and the outlet section comprises a second damper 134.

The inlet section 102 has a first diameter 112, the middle section 103 has a second diameter 113 and the outlet section 104 has a third diameter 114.

The noise reduction unit 100 is adapted to be flown through by material to be conveyed in the direction of the arrow 150, i.e. from the inlet section via the middle section to the outlet section.

The second diameter 113 of the middle section 103 is larger than the first diameter 112 of the inlet section 102. Thus, the extension of the diameter of the noise reduction unit from the inlet section to the middle section will cause turbulences 155 which may lower or reduce the kinetic energy of the transportation air and the material to be conveyed. This may in particular be used in connection with short vacuum suction drains (i.e. drains connecting a suction point to the waste collecting container, wherein the suction point is close to the waste collecting container) in which a reduction of the kinetic energy will not lead to an insufficient flow velocity.

The transition from the first diameter to the second diameter may be constructed in form of a stage or a terrace, as shown by the dashed line 105A. Furthermore, this transition may be shaped as a rounded transition, in particular concave shaped as shown by the reference sign 105B or convex shaped.

The turbulences 155 may result in vibrations of the noise reduction unit with an oscillation direction parallel and anti-parallel to the flow direction 150. In order to avoid an increased noise level due to these vibrations the first damper 132 and the second damper 134 are adapted to absorb and damp the vibrations.

The first damper and the second damper may be adapted as part of the inlet section and the outlet section, respectively or for interconnecting the inlet section and the outlet section with the vacuum suction drain. In particular, the first damper and the second damper may be an elastic seal or gasket which is adapted to absorb vibrations.

The third diameter may be identical to the first diameter or larger than the first diameter such that solid phase material may pass the outlet section without clogging the noise reduction unit.

Figure 2:
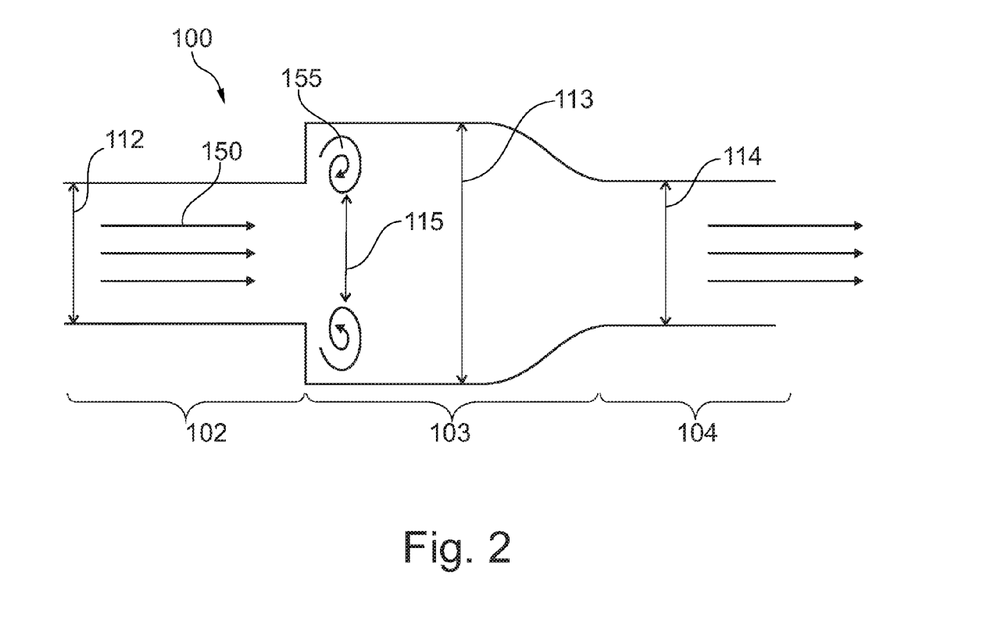
FIG. 2 schematically illustrates a noise reduction unit according to a further exemplary embodiment of the invention.

FIG. 2 schematically shows a sectional view of a noise damper, wherein the effect of the turbulences 155 is pointed out.

The arrows 150 indicate the flow direction of the material to be conveyed. At the transition point from the inlet section 102 to the middle section 103, i.e. from the first diameter to the second diameter, which second diameter is larger than the first diameter and thus causes turbulences 155.

The turbulences 155 rising at the transition point from the inlet section to the middle section may reduce the effective cross-section of the noise reduction unit, which is indicated by the effective diameter 115 between the turbulences 155. Thus, the effective diameter 115 will reduce the kinetic energy of the material flow even thought the second diameter 113 of the middle section 104 is larger than the first diameter 112.

The embodiments of the noise reduction unit 100 illustrated in FIGS. 1 and 2 lower the flow velocity of the material to be conveyed due to the turbulences rising at the broadening section at the transition from the inlet section to the middle section. Even though creating a resistance against the material flow, solid phase material may pass the noise reduction unit without clogging it, as the turbulences do not lead to a blockage.

Figure 3:
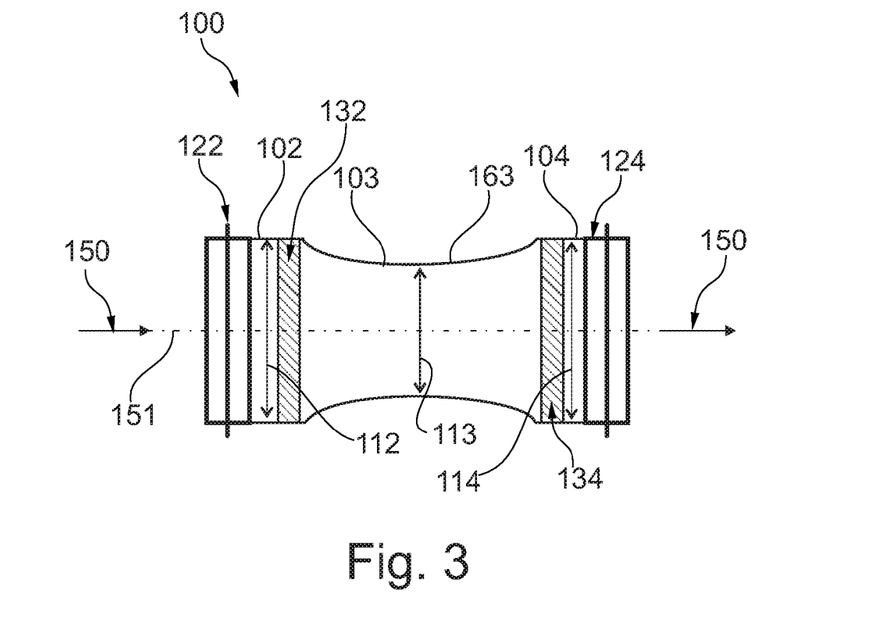
FIG. 3 illustrates a noise reduction unit according to a further exemplary embodiment of the invention.

FIG. 3 illustrates a noise reduction unit 100, wherein the middle section 103 comprises a flexible hose 163. The flexible hose comprises a constriction, such that the second diameter 113 is reduced compared to the first diameter 102 of the inlet section.

The specification of the inlet section 102 and the outlet section 104 of FIGS. 1 and 2 also apply to the embodiment shown in FIG. 3.

Viewing in flow direction 150, the flexible hose 163 first constantly narrows towards the central axis 151 until reaching the maximum constriction depicted by the second diameter 113 and subsequently broadens such that the flexible hose is adaptable to the outlet section 104.

In order not to be vulnerable to clogging by solid phase material the flexible hose is adapted to be expandable such that the second diameter 113 enlarges and the second diameter adapts to the first diameter 112 when being flown through by solid phase material. In contrary to that, the flexible hose reduces the cross-section of the middle section such that the flow velocity of the transportation air or fluid in general may be reduced. This may reduce the amount of air used for the transportation process, which results in a noise reduction.

The noise reduction unit may comprise a casing or a jacket in the area of the flexible hose, wherein the casing or jacket is adapted to protect the surrounding of the noise reduction unit from leak out liquid in case of a leak in the flexible hose.

Figure 4:
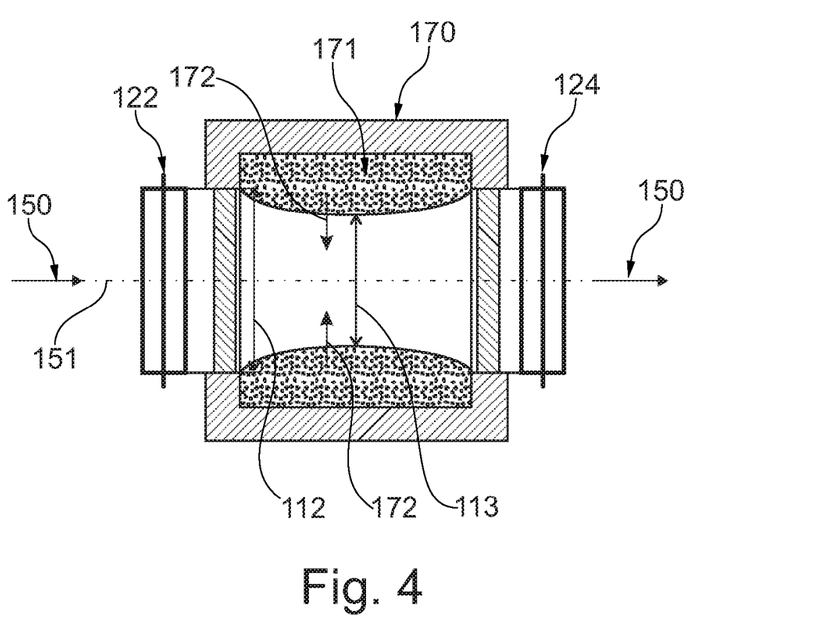
FIG. 4 illustrates a noise reduction unit according to a further exemplary embodiment of the invention.

FIG. 4 illustrates the noise reduction unit of FIG. 3, wherein a pressurization element 170 surrounds the noise reduction unit in a circumferential manner. The pressurization element 170 comprises a gas volume 171 which is adapted to apply or exert pressure to the flexible hose in the direction indicate by arrows 172, that is towards the central axis 151 of the noise reduction unit. The pressurization element 170 and the noise reduction unit may for this purpose be connected substantially gas-tight or sealed.

The pressurized gas volume and the material properties of the flexible hose are adapted to reduce the second diameter 113, wherein a solid phase material may still pass the noise reduction unit as the flexible hose and the gas volume allow an extension or enlargement of the second diameter. Thus, the flow velocity of air and liquid phase material and the according transport noise may be reduced due to the reduced second diameter without being vulnerable to clogging due to the extensible second diameter.

The gas volume and the flexible hose work as an attenuator or a damper with respect to the movement or fluctuation of the walls of the flexible hose in a direction orthogonal to the flow direction (that is: to and from the central axis) when being passed by solid phase material such that the second diameter needs to extend.

Figure 5:
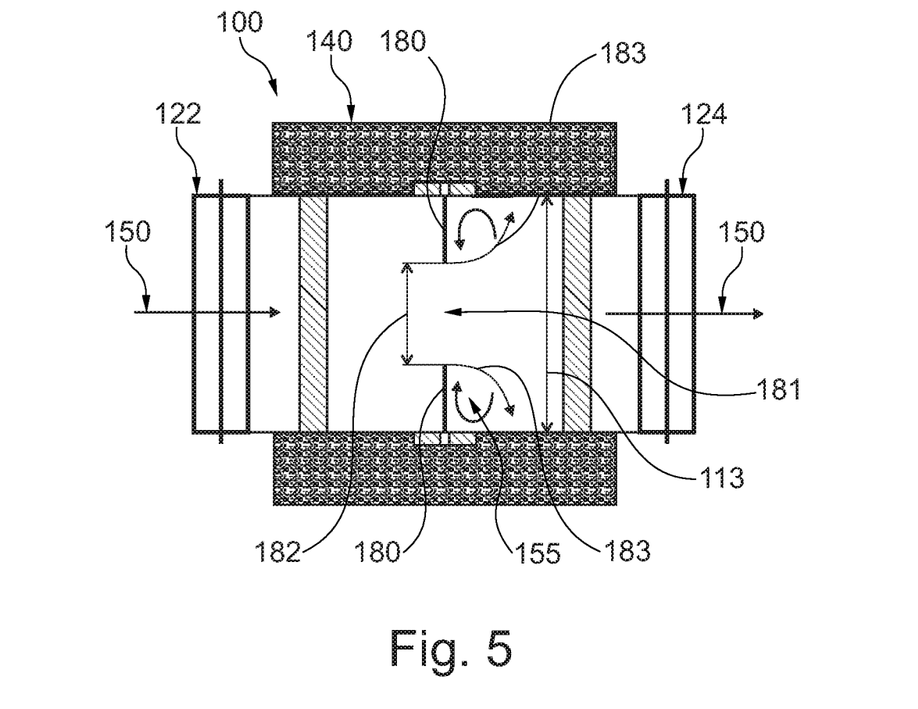
FIG. 5 illustrates a noise reduction unit according to a further exemplary embodiment of the invention.

FIG. 5 shows a noise reduction unit with a membrane 180 arranged in the middle section. The middle section is surrounded by a noise insulation element 140. The noise insulation element may alternatively surround the complete noise reduction unit.

The membrane 180 is arranged such that it extends in a plane orthogonal to the flow direction 150, i.e. that the flow direction 150 is perpendicular to the membrane. The membrane comprises an opening 181 with a membrane opening diameter 182 which is less than the diameter of the noise reduction unit, in this case less than the second diameter of the middle section.

It should be noted that the membrane may also be arranged in the inlet section or the outlet section as well as a multitude of membranes may be arranged in each of the inlet, middle and outlet sections.

The membrane is adapted to turn down in direction of the flow direction 150 as indicated by the arrows 183. This will lead to an enlargement of the membrane opening diameter 182.

The membrane may comprise elastically reversible material such that the membrane is in its original shape in an unloaded state of the noise reduction unit (that is: no material conveyance in progress) and the membrane will turn down according to the arrows 183 in case a vacuum suction is in progress and material flows in direction of the arrows 150.

The pressure resistance of the membrane may vary such that the membrane turns down only in case solid phase material passes the opening 181. Otherwise (that is: air and liquid phase material pass the membrane opening) the membrane keeps its original shape as shown in FIG. 5.

FIG. 5 further depicts that turbulences 155 may occur in direction of the material flow behind the membrane, i.e. at the position at which an enlargement of the diameter from the membrane opening diameter 182 to the second diameter 113 occurs. These turbulences may further reduce the flow velocity of the material to be conveyed.

The membrane 180 shown in FIG. 5 may also be used in connection with all of the embodiments shown above and hereinafter.

FIGS. 6A, 6B, 6C and 6D show exemplary embodiments of the membrane 180. The membrane comprises an outer edge 186, an inner edge 187 and the opening 181, wherein the form of the outer edge is adapted to the form of the noise reduction unit and the inner edge represents the contour or the membrane opening.

Even though the shown membrane shows a circular shape of the outer edge, several more forms of the membrane are possible. In particular, the outer edge 186 of the membrane 180 is adaptable to all possible profiles of the noise reduction system and a pipe or duct in general. Furthermore, the shape and the size of the opening may be adapted to the composition of the material to be conveyed, i.e. the opening may be smaller in case only liquid phase material is expected to pass the membrane.

The membrane may comprise latex and/or silicone, for example.

Figure 6A:
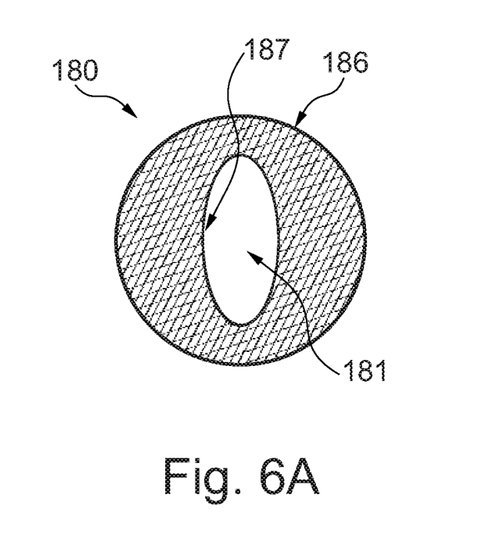
FIG. 6A illustrates a membrane for a noise reduction system according to a further exemplary embodiment of the invention.

FIG. 6A shows a membrane with an elliptical opening.

Figure 6B:
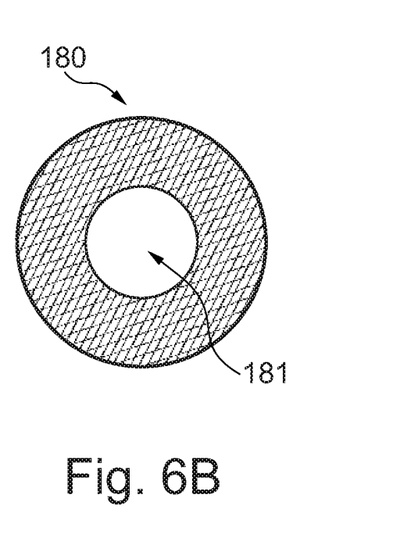
FIG. 6B illustrates a membrane for a noise reduction system according to a further exemplary embodiment of the invention.

FIG. 6B shows a membrane with a circular opening.

The embodiments shown in both FIGS. 6A and 6B are adapted to expand the opening due to elasticity or flexibility of the membrane.

Figure 6C:
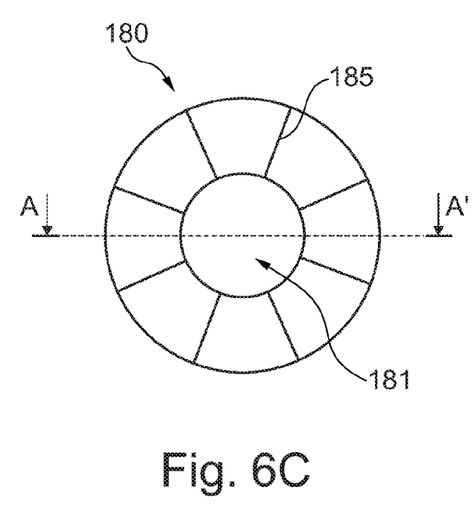
FIG. 6C illustrates a membrane for a noise reduction system according to a further exemplary embodiment of the invention.

FIG. 6C shows a membrane comprising a multitude of stiffening elements 185 which are adapted to keep the membrane in its unloaded position, i.e. perpendicular to the flow direction of the material to be conveyed. The stiffening elements extend in a radial direction of the membrane and may avoid oscillating and fluttering of the membrane when being flown through by the material to be conveyed. Such an oscillation of the membrane may also generate noise, which is to be avoided. The stiffness of the stiffening elements may be variable and/or controllable, i.e. stiffening elements with differing stiffness may be used or stiffening elements whose stiffness is adaptable may be used.

Figure 6D:
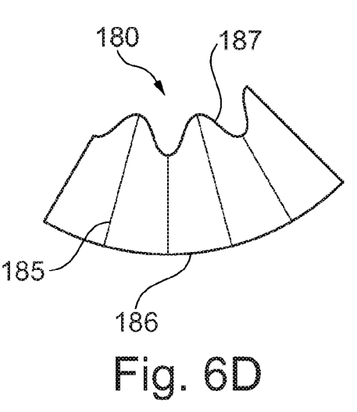
FIG. 6D illustrates a sectional view of a membrane for a noise reduction system according to a further exemplary embodiment of the invention.

FIG. 6D shows a sectional view along the cutting line A-A' in FIG. 6C. The stiffening elements 185 extend from the outer edge 186 to the inner edge 187, wherein the inner edge is designed wavy such that the length of the inner edge is greater than the extend of the membrane opening. This enables the membrane to turn down without or with less material stretching, as the membrane comprises a material excess which forms the wavy course of the inner edge.

Figure 7:
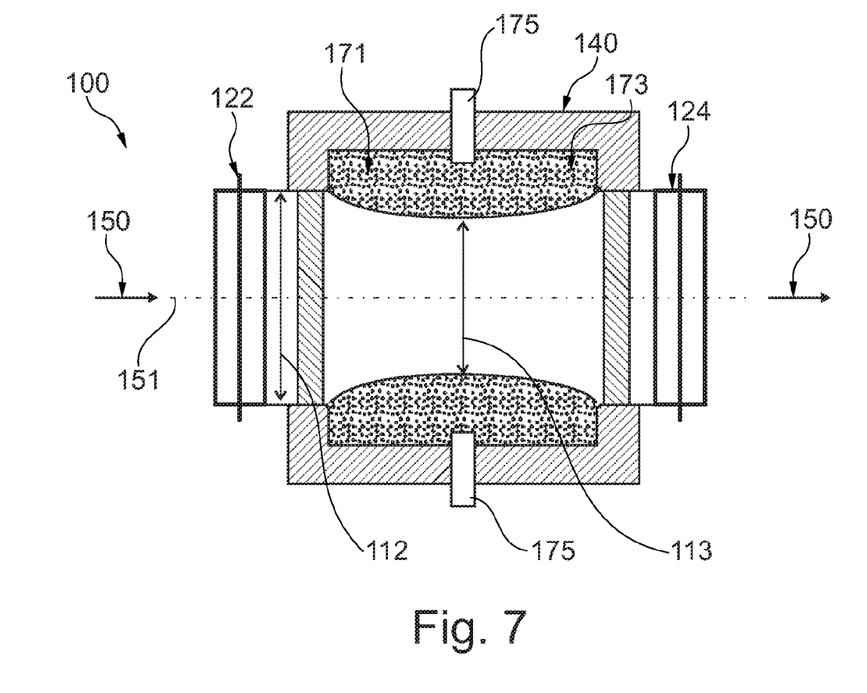
FIG. 7 illustrates a noise reduction system according to a further exemplary embodiment of the invention.

FIG. 7 shows a noise reduction unit comparable to the embodiment shown in FIG. 4 but further comprises a gas duct 175 for letting the gas flow into and out of the gas volume 171.

The pressurization element further comprises an elastically reversible element 173 which is arranged in the gas volume in order to apply or exert a pressure to the wall of the flexible hose toward the central axis 151.

The gas duct 175 applies a pressure from the surroundings or ambience of the noise reduction unit to the gas volume 171. For example in an aircraft the cabin pressure may be applied to the gas volume, as the cabin pressure is in general higher than the pressure in the vacuum suction drain. The gas duct 175 is adapted to let out the gas of the gas volume 171 in case solid phase material passes the flexible hose and an extension of the flexible hose is necessary to let the solid phase material pass through. Thus, clogging of the flexible hose is avoided. When being passed by fluid phase material such as liquid or gas, the flexible hose constricts or contracts and gas will be let into the gas volume 171 through the gas duct 175.

The gas duct 175 may comprise a pipe with a variable cross-section or profile, wherein the size of the cross-sectional area may vary, that is: the cross-sectional areas of the ducts differ from each other.

The cross-sectional area of the gas duct 175 may be adapted to dampen the compensation flowing of the gas into and out of the gas volume 171 in case the diameter of the flexible hose varies due to being flown through by multiphase material.

Figure 8:
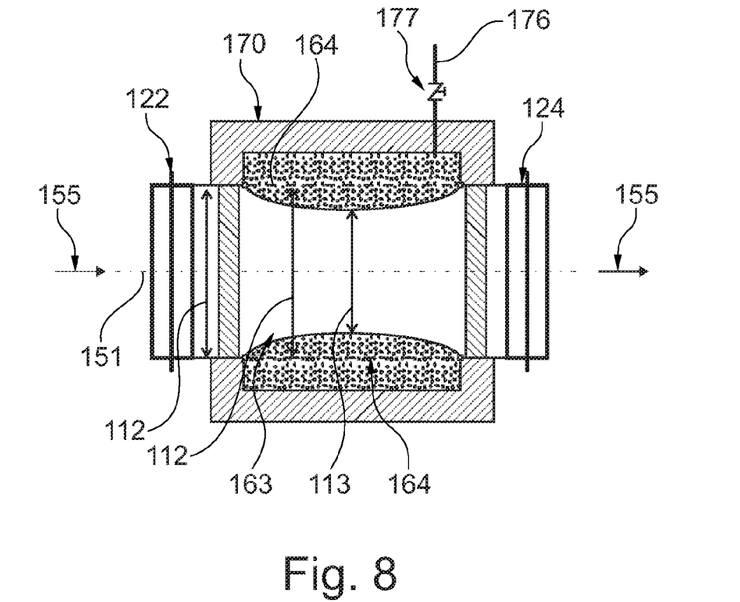
FIG. 8 illustrates a noise reduction system according to a further exemplary embodiment of the invention.

In a similar manner, FIG. 8 shows a noise reduction unit, wherein the pressurization element comprises a gas supply 176 for compressed gas, which gas supply 176 comprises a valve 177 such that the gas pressure in the gas volume may be controlled.

The gas pressure in the gas volume 171 may be static or dynamic.

In the first case, that is: static, the gas pressure may be brought to a given value prior to starting the conveying process through the vacuum suction drain and the noise reduction unit, wherein during the conveying process no or substantially no gas escapes from the gas volume. The static gas pressure may in particular be adapted to a projected flow velocity of the material to be conveyed or to a pressure difference used for the suction process, wherein a high pressure difference requires a higher gas pressure than an low pressure difference, as the high pressure difference leads to a higher flow velocity of the material to be conveyed.

In particular, the static gas pressure may be dependent from the distance of a suction point to the waste collecting container, as a suction point close to the waste collecting container is addressed to a higher pressure difference than a suction point more distant to the waste collecting container. Thus, the gas pressure in the gas volume 171 of a noise reduction unit related to a suction point close to the waste collecting container may be higher than the gas pressure in the gas volume 171 of a noise reduction unit related to a suction point more distant to the waste collecting container.

In the second case, that is: dynamic, the gas pressure may vary during the conveying process. In a first phase of the conveying process, when in particular air passes through the noise reduction unit, the gas pressure in the gas volume 171 may be high such that the diameter of the flexible hose is tight and an initial noise when starting the suction process is kept low. In a subsequent phase of the conveying process, the gas pressure may be reduced in order to allow an expansion or extension of the diameter of the flexible hose such that the material to be conveyed is allowed to pass the noise reduction unit.

Of course, the static and the dynamic case of the gas pressure in the gas volume may be combined, i.e. the gas pressure in the gas volume is static prior to starting the conveying process and varies during the conveying process.

Furthermore, FIG. 8 illustrates that the flexible hose 163 may extend until the wall of the flexible hose achieves the dotted line 164 representing the extend of the flexible hose which corresponds to the first diameter 112 such that solid phase material does not lead to clogging in the middle section.

Corresponding to the dotted line 164, a perforated sheet may be arranged such that the gas may pass through the perforations when the wall of the flexible hose extends towards or away from the central axis.

The flexible hose may be adapted for folding or skin wrinkling, wherein the edges of the folds extend parallel to the flow direction 150. The folds may stabilize the flexible hose and may avoid vibrations or oscillations of the flexible hose, thus avoiding a noise generations due to material vibrations.

Figure 9:
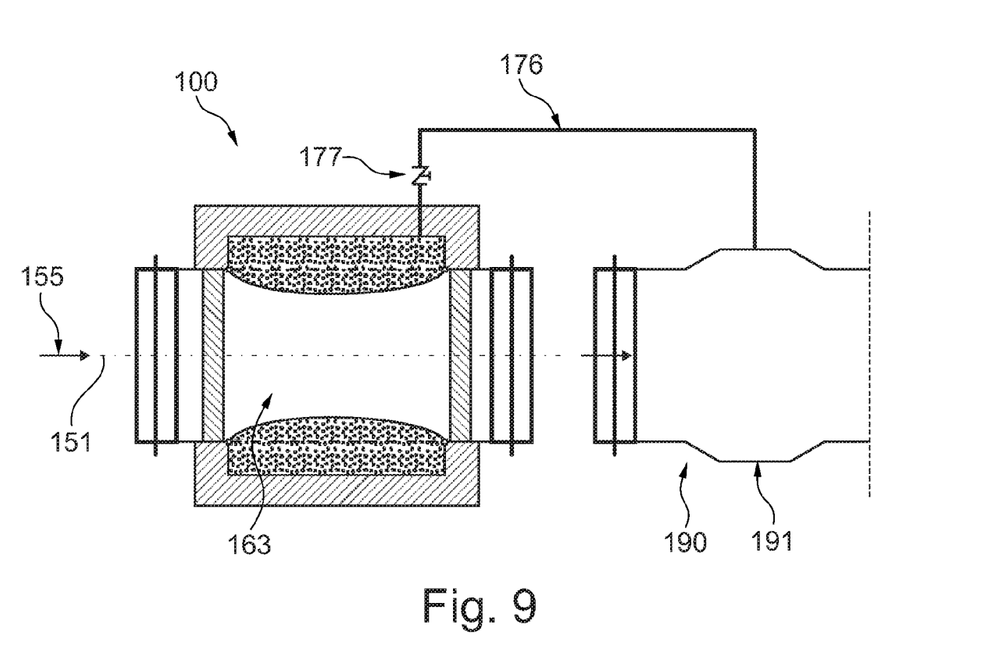
FIG. 9 illustrates a noise reduction system according to a further exemplary embodiment of the invention.

FIG. 9 illustrates a noise reduction unit 100 and an outlet pipe 190 which are both interconnected via a compressed gas supply 176. The noise reduction unit 100 can be any embodiment of the noise reduction unit described above and hereinafter. The noise reduction unit 100 is adapted for being connected with its outlet section to the outlet pipe 190.

The outlet pipe 190 comprises a broadened section 191. In general, in a pipe flown through by a fluid which pipe comprises a broadened section, an increased pressure will arise in the broadened section, wherein the pressure increases corresponding to the increased flow velocity of the conveyed fluid.

As can be seen in FIG. 9, the compressed gas supply 176 connects the broadened section 191 of the outlet pipe 190 with the gas volume of the pressurization element surrounding the noise reduction unit, in particular the flexible hose of the middle section.

Thus, an increased flow velocity of the material to be conveyed leads to an increased pressure in the broadened section 191 which increased pressure is coupled to the gas volume of the pressurization element and for its part leads to a higher extension of the flexible hose which results in a reduced second diameter in the middle section of the noise reduction unit. The reduced second diameter will reduce the flow velocity of the material to be conveyed. Hence, the system depicted in FIG. 9 may be a self-regulating system for the flow velocity of the material to be conveyed.

The valve 177 in the gas supply 176 may be adapted to close or open the gas supply or to partially close the cross-section of the gas supply such that the transmission of the gas pressure in the broadened section 191 may be delayed or reduced such that a change of the gas pressure in the broadened section is transmitted only partially to the gas volume of the pressurization element. For example, the change of the fluid pressure in the broadened section may be transmitted at a given ratio of 2 to 1 (that is: half of the gas pressure in the broadened section is transmitted to the gas volume) to the gas volume. Of course, other ratios are possible such as 4 to 1 or 10 to 1. In particular, the ratio may be adjusted by means of the valve 177.

Figure 10:
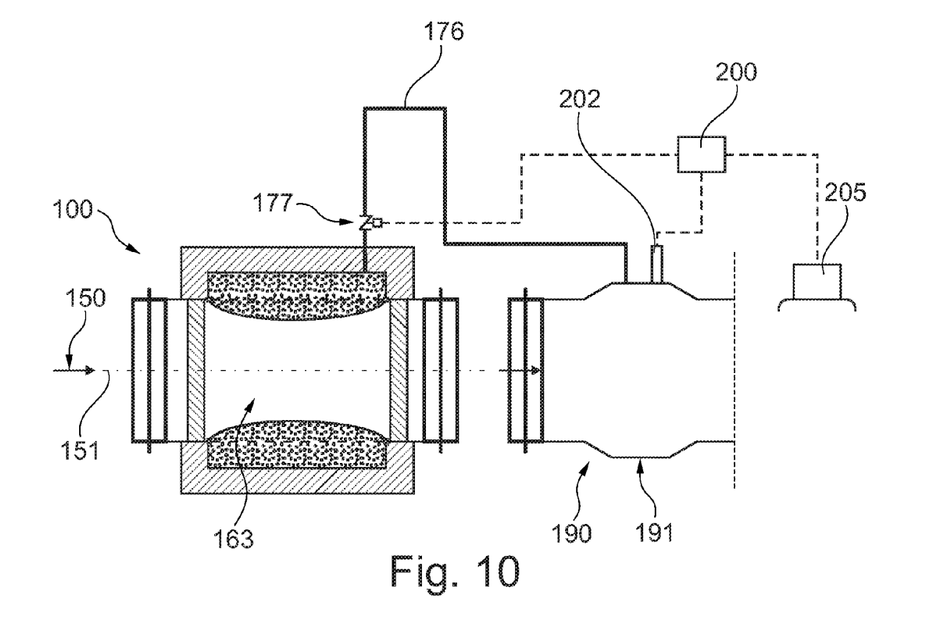
FIG. 10 illustrates a noise reduction system according to a further exemplary embodiment of the invention.

FIG. 10 illustrates the system depicted in FIG. 9 and updated with a control system for adjusting the transmission of the gas pressure from the broadened section 191 to the gas volume of the pressurization element.

The control system comprises a controller unit 200 which is connected to a pressure detector 202, a noise detector 205 and to the valve 177 in the gas supply 176.

The controller unit is adapted to receive the sampled gas pressure in the broadened section from the pressure detector 202 and a noise level acquired by the noise detector 205.

Depending on the acquired noise and pressure values, the controller unit may initiate a modification of the valve 177 such that the transmitted gas pressure from the broadened section 191 to the gas volume may increase or decrease and the flow velocity of the material to be conveyed is being reduced or increased, respectively.

The controller unit may be adapted to adjust the valve such that the flow velocity of the material to be conveyed varies dependent on a given nominal value of the noise level.

Figure 11:
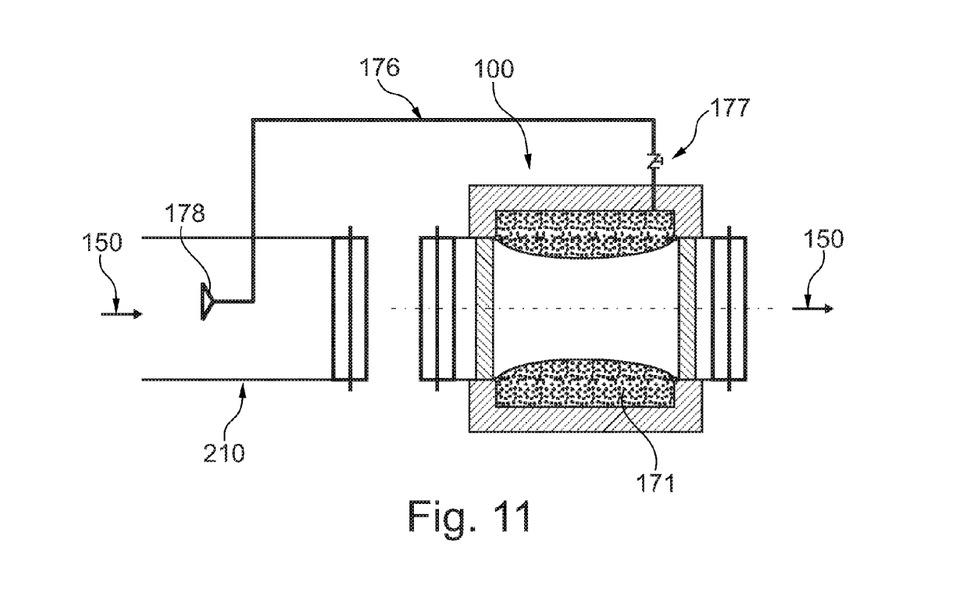
FIG. 11 illustrates a noise reduction system according to a further exemplary embodiment of the invention.

FIG. 11 shows an exemplary embodiment of the noise reduction unit similar to that depicted in FIG. 9 except that the gas supply 176 is connected to a gas funnel 178 which is adapted to soak up a pressure in the inlet pipe 210. The gas funnel 178 leads the pressure in the inlet pipe 210 via the gas supply 176 to the gas volume 171 such that the pressure in the gas volume either increases or decreases which results in that the constriction of the flexible hose, that is the diameter 113, either decreases or increases, respectively. An increases flow velocity, which corresponds to an increased pressure level in the inlet pipe 210 leads to an increased pressure in the gas volume 171 which further leads to a decreased diameter 113 of the flexible hose, such that the flow velocity of the material to be conveyed will be reduced. This interrelation between the flow velocity and the pressure in the inlet pipe on the one hand and the pressure in the gas volume and the diameter of the flexible hose on the other hand applies as well vice versa: on the one hand a high flow velocity and pressure in the inlet pipe results in a higher pressure in the gas volume 171 and a smaller diameter of the flexible hose such that the flow velocity is being reduced, on the other hand, a low flow velocity and pressure in the inlet pipe results in a lower pressure in the gas volume 171 and a greater diameter of the flexible hose such that the flow velocity may increase. The valve 177 is adapted to adjust the ratio of the transmitted pressure from the inlet pipe to the gas volume of the pressurization element.

Furthermore, FIG. 11 depicts the inlet pipe 210 for connecting to the inlet section of the noise reduction unit.

In an alternative exemplary embodiment, the gas funnel 178 may be arranged in an air intake pipe used for taking in air for the conveying process. In this embodiment, the pipe 210 shown in FIG. 11 corresponds to the air intake pipe and the suction point is arranged between the air intake pipe and the noise reduction unit 100 shown in FIG. 11. Thus, the air soaked in through the air intake pipe applies to the gas funnel and is lead through the gas supply 176 to the gas volume 171. The gas funnel 178 is not addressed to the multiphase material to be conveyed.

In this alternative exemplary embodiment, the diameter of the gas funnel, i.e. the diameter at the largest opening of the gas funnel, and the diameter of the air intake pipe may vary such that the ratio of the diameter of the gas funnel and the air intake pipe is adaptable in order to affect the gas pressure in the gas volume 171. The greater the diameter of the gas funnel is and the lower the diameter of the air intake pipe is, the higher gets the gas pressure applied to the gas volume through the gas supply 176. The air circulation from the air intake pipe through the suction point, the vacuum suction pipe and the noise reduction unit may be a closed circuit, i.e. the transportation air enters the said closed circuit substantially through the air intake pipe.

Figure 12:
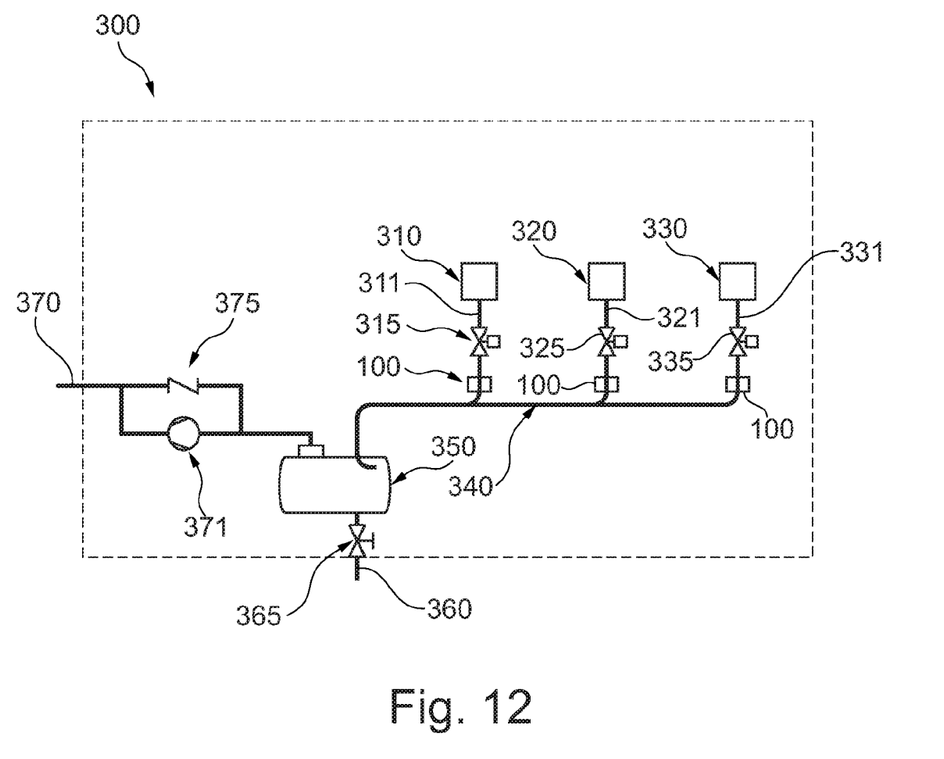
FIG. 12 illustrates a vacuum suction system according to an exemplary embodiment of the invention.

FIG. 12 illustrates a vacuum suction system 300 with a first vacuum suction point 310, a second vacuum suction point 320 and a third vacuum suction point 330. The suction points are connected via a first drain 311, second drain 321 and third drain 331, respectively to a main drain 340, which main drain is connected to the waste collecting container 350. A first opening valve 315, second opening valve 325 and third opening valve 335 is arranged in the first drain, second drain and third drain, respectively. A noise reduction unit 100 is arranged in each of the first drain, second drain and third drain.

It should be noted that the noise reduction unit shown in FIG. 12 may be a noise reduction unit as described above and hereinafter, but it can be used any other means for reducing the flow velocity in the first, second and third drain.

The waste collecting container is connected to a vacuum via the vacuum inlet drain 370 in order to introduce a vacuum into the drains of the vacuum suction system. A vacuum in the waste collecting container 350 enables the conveyance of material through the suction drains from the suction points to the collecting container as the pressure in the surroundings of the vacuum suction points is higher than the pressure in the collecting container.

The vacuum inlet drain 370 comprises a vacuum pump 371 for generating a vacuum in case the pressure difference to the surroundings (that is: outside of the dashed box, which depicts a closed pressure isolated system) is not sufficient for ensuring the conveying process of the material to be conveyed.

Furthermore, the vacuum inlet drain 370 comprises a vacuum inlet valve 371 for leading vacuum into the collecting container.

The collecting container further comprises a waste disposal drain 360 with a waste disposal valve 365 for disposing the waste.

The noise reduction units 100 arranged in the first, second and third drain are adapted for reducing the flow velocity of the material to be conveyed through the corresponding vacuum suction drains. As the third vacuum suction point 330 is arranged most distant to the waste collecting container, the pressure difference for conveying the material to be conveyed has to be higher than at the first vacuum suction point due to the pressure reducing effect of the vacuum suction drains itself, i.e. the longer the vacuum suction drain is, the more will a pressure difference be reduced by the volume of the vacuum suction drain.

The vacuum suction system depicted in FIG. 12 allows an adjustment of flow velocity and thus of the noise level for each individual vacuum suction point. Thus, the generated noise does not only depend on the pressure difference of each vacuum suction point to the waste collecting container, as the flow velocity of the material to be conveyed may be adapted for each vacuum suction drain connecting a vacuum suction point to the waste collecting container.

The opening valves 315, 325 and 335 are adapted to start a conveying process of material to be conveyed from the vacuum suction points to the waste collecting container.

The length of the main drain and of the first, second or third drain corresponds to the distance between a vacuum suction point and the waste collecting container, i.e. the crucial point is the distance which has to be passed by the material to be conveyed.

Derogating from the representation in FIG. 12, the pressure difference between the waste collecting container and that one of the vacuum suction points arranged at the largest distance to the waste collecting container may be adapted such that the noise level generated at this vacuum suction point corresponds to the minimum noise level, i.e. the conveying velocity corresponds to the minimum velocity which ensures a reliable conveyance of the material. In this case, the pressure difference may be to high for the vacuum suction points arranged at a lower distance to the waste collecting container such that the flow velocity and the noise level in these suction points is higher than necessary for a reliable conveyance of material. Thus, a noise reduction unit for reducing the flow velocity may be arranged in the respective vacuum suction drains.

For example, the distance of the vacuum suction points to the waste collecting container may be between 3 m and 40 m.

In contrary to a closed loop system, the vacuum suction system as described above and hereinafter is an open loop system, as the material to be conveyed through the vacuum suction drains is fed externally.

Even though the depicted vacuum suction system comprises three vacuum suction points, the inventive idea applies to vacuum suction systems with any number of vacuum suction points.

Of course there may be arranged two or more noise reduction units in one vacuum suction drain. One of the noise reduction units may be adapted to reduce the initial noise in the first phase of the conveying process when almost the complete conveyed material is the transport air and another one of the noise reduction units may be adapted to reduce the noise during the conveyance of the multiphase material.

Figure 13:
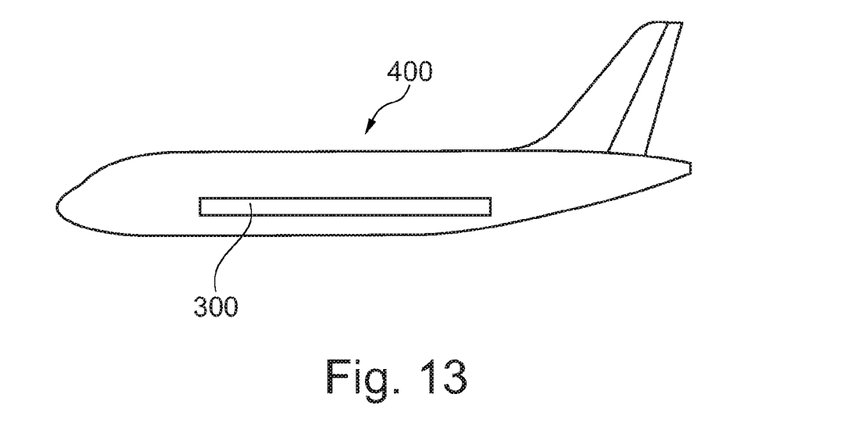
FIG. 13 illustrates an aircraft with a vacuum suction system according to an exemplary embodiment of the invention.

FIG. 13 shows an aircraft with a vacuum suction system as described above and hereinafter.

The dashed box shown in FIG. 12 schematically depicts the passenger compartment of the aircraft, as this volume is separated from the surroundings such that there is a pressure difference between the passenger compartment and the surroundings, in particular in a flight phase of the aircraft. The pressure difference facilitates the conveying process through the vacuum suction drains.

The vacuum suction points may be a toilet bowl, an urinal, a wash water basin or a ventilation element.

In the claims, the word "comprising" does not exclude other elements or steps and the indefinite article "a" or "an" does not exclude a plurality.

LIST OF REFERENCE SIGNS 100 noise reduction unit
102 inlet section
103 middle section
104 outlet section
105A transition region
105B transition region
112 first diameter
113 second diameter
114 third diameter
115 effective cross-section
122 first connector
124 second connector
132 first damper
134 second damper
140 noise insulation element
150 flow direction
151 central axis
155 flow turbulences
163 flexible hose
164 expanded position of the flexible hose
170 pressurization element
171 gas volume
172 pressure direction
173 elastically reversible element
175 gas duct
176 compressed gas supply
177 valve
178 gas funnel
180 membrane
181 membrane opening
182 diameter of the membrane opening in an unloaded state
183 moving direction of the membrane in a loaded state
185 stiffening element
186 outer edge of the membrane
187 inner edge of the membrane
190 outlet pipe
191 broadened section of the outlet pipe
200 controller unit
202 pressure detector
205 noise detector
210 inlet pipe
300 vacuum suction system
310 first vacuum suction point
311 first drain
315 first opening valve
320 second vacuum suction point
321 second drain
325 second opening valve
330 third vacuum suction point
331 third drain
335 third opening valve
340 main drain
350 waste collecting container
360 waste disposal drain
365 waste disposal valve
370 vacuum inlet drain
371 vacuum pump
375 vacuum inlet valve
400 aircraft

The invention claimed is:

1. A noise reduction unit for inserting in a vacuum suction drain, wherein the noise reduction unit is adapted to be flown through by a material to be conveyed through the vacuum suction drain extending between a suction point and a collection point, the noise reduction unit comprising:
    an inlet section with a first diameter, the inlet section configured to be connected to an inlet section of the vacuum suction drain;
    a middle section with a second diameter; and
    an outlet section with a third diameter, the outlet section configured to be connected to an outlet section of the vacuum suction drain;
    wherein the middle section is arranged between the inlet section and the outlet section in a longitudinal direction of the noise reduction unit;
    wherein the middle section is adapted to affect a flow velocity reduction of the material to be conveyed from the inlet section to the outlet section by causing turbulences therein, thereby reducing an effective cross-section of the vacuum section drain;
    wherein the second diameter differs from both the first diameter and the third diameter;
    wherein the second diameter is smaller than the first diameter;
    wherein, in the longitudinal direction of the noise reduction unit, the middle section narrows towards a central axis of the noise reduction unit from the first diameter to the second diameter and subsequently broadens from the second diameter to the third diameter such that the middle section is adapted to the outlet section.

2. The noise reduction unit according to claim 1, wherein the second diameter differs from the first diameter such that the flow of the material to be conveyed through the noise reduction unit causes turbulences in the vacuum suction drain;

wherein the turbulences reduce the effective cross-section of the vacuum suction drain such that the flow velocity of the material to be conveyed is reduced.

3. The noise reduction unit according to claim 2, wherein the second diameter is greater than the first diameter and the enlargement of the second diameter with respect to the first diameter is adapted to cause the turbulences in the flow of the material to be conveyed.

4. The noise reduction unit according to claim 1, wherein the reduction of the second diameter with respect to the first diameter is adapted to reduce the flow velocity of the material to be conveyed.

5. The noise reduction unit according to claim 4, wherein the middle section comprises a flexible hose;
   wherein the flexible hose is arranged between the inlet section and the outlet section;
   wherein the flexible hose comprises a constriction, the constriction corresponding to the second diameter.

6. The noise reduction unit according to claim 5, wherein the flexible hose comprises a material tension, the material tension resulting in a constriction of the flexible hose.

7. The noise reduction unit according to claim 5, further comprising a pressurization element adapted to cause the constriction of the flexible hose.

8. The noise reduction unit according to claim 7, wherein the pressurization element comprises a gas volume adapted to press the wall of the flexible hose towards a central axis of the noise reduction unit.

9. The noise reduction unit according to claim 8, wherein a gas pressure of the gas volume is controllable;
   wherein the controlled gas pressure is adapted to vary the second diameter;
   wherein an increased gas pressure causes a greater constriction of the flexible hose such that the second diameter is reduced.

10. The noise reduction unit according to claim 7, wherein the pressurization element comprises an elastically reversible element;
    wherein the elastically reversible element is adapted to exert a pressure to the wall of the flexible hose in a direction towards the central axis of the noise reduction unit.

11. The noise reduction unit according to claim 1, further comprising:
    an elastic membrane;
    wherein the elastic membrane extends in a plane orthogonal to the flow direction and comprises an opening for being flown through by the material to be conveyed;
    wherein the elastic membrane is adapted to extend when being flown through by the material to be conveyed; and
    wherein the opening of the membrane is adapted to reduce the effective cross-section of the noise reduction unit such that a flow velocity of the material to be conveyed is reduced.

\* \* \* \* \*